(12) United States Patent
Bang

(10) Patent No.: US 12,131,478 B2
(45) Date of Patent: Oct. 29, 2024

(54) METHOD FOR OBJECT SEGMENTATION BASED ON DEEP-LEARNING USING A TRAINED NEURAL NETWORK AND SYSTEM FOR PERFORMING THE SAME

(71) Applicant: GYNETWORKS CO., LTD., Incheon (KR)

(72) Inventor: Seung On Bang, Seoul (KR)

(73) Assignee: GYNETWORKS CO., LTD., Incheon (KR)

(*) Notice: Subject to any disclaimer, the term of this patent is extended or adjusted under 35 U.S.C. 154(b) by 354 days.

(21) Appl. No.: 17/584,540

(22) Filed: Jan. 26, 2022

(65) Prior Publication Data
US 2022/0245818 A1    Aug. 4, 2022

(30) Foreign Application Priority Data

Feb. 4, 2021  (KR) .................. 10-2021-0016258
Nov. 25, 2021 (KR) .................. 10-2021-0164131

(51) Int. Cl.
*G06T 7/10*    (2017.01)
(52) U.S. Cl.
CPC ...... *G06T 7/10* (2017.01); *G06T 2207/20081* (2013.01); *G06T 2207/20084* (2013.01); *G06T 2207/20221* (2013.01)
(58) Field of Classification Search
None
See application file for complete search history.

(56) References Cited

U.S. PATENT DOCUMENTS

| | | | | |
|---|---|---|---|---|
| 11,074,501 | B2* | 7/2021 | Bang | G06V 10/774 |
| 11,670,036 | B2* | 6/2023 | Paglieroni | G06T 15/005 |
| | | | | 345/424 |
| 11,687,787 | B2* | 6/2023 | Bang | G06N 3/045 |
| | | | | 382/157 |
| 11,769,385 | B2* | 9/2023 | Cheng | G05B 19/4188 |
| | | | | 340/628 |
| 2005/0069207 | A1* | 3/2005 | Zakrzewski | G06V 20/52 |
| | | | | 382/218 |
| 2019/0220709 | A1* | 7/2019 | Freeman | G06N 3/08 |
| 2022/0020203 | A1* | 1/2022 | Paglieroni | G06T 15/005 |
| 2022/0245818 | A1* | 8/2022 | Bang | G06T 7/11 |
| 2023/0401274 | A1* | 12/2023 | Denninghoff | G06Q 30/0251 |

* cited by examiner

Primary Examiner — Tahmina N Ansari
(74) Attorney, Agent, or Firm — WHDA, LLP

(57) ABSTRACT

The present invention relates to a neural network for object segmentation. A method for object segmentation using a trained neural network according to an embodiment of the present invention includes receiving a segmentation target image, splitting the target image into unit images having a predetermined size, outputting a unit activation map for the split unit image as a first segmentation result by using the neural network, merging the unit activation map, and outputting a second segmentation result according to the merged unit activation map, in which the neural network is trained by mutually using the entire activation map for the target image and the merged activation map. According to the present invention, it is possible to generate a more accurate object segmentation result, and generate a label using the segmentation result and use the generated label for training of a neural network.

5 Claims, 8 Drawing Sheets

$L_{cls}$ $L_{cls} + L_{p\text{-}cls}$ $L_{cls} + L_{re}$ $L_{cls} + L_{p\text{-}cls} + L_{re}$

METHOD FOR OBJECT SEGMENTATION BASED ON DEEP-LEARNING USING A TRAINED NEURAL NETWORK AND SYSTEM FOR PERFORMING THE SAME

BACKGROUND

1. Field

The present invention relates to a neural network for object segmentation.

2. Description of Related Art

With the development of artificial intelligence technology, artificial intelligence is being used in various technological fields.

In particular, various algorithms based on deep-learning have been developed to track an object through mathematical operations based on pixel values of an input image and classify the tracked object, and convolutional neural network (CNN) models combined by a plurality of layers that perform a convolution operation on feature values defined in a matrix have been optimized and used depending on an applied domain.

However, the output of the neural network model depends on operation results of layers called a hidden layer, and there is a need to interpret the hidden layers to understand why the neural network outputs these results.

Accordingly, an algorithm called class activation maps (CAMs) is presented as a thesis at MIT in 2015, and the CAM proposes a method for representing a certain feature as an important factor when the neural network model determines the certain feature using a feature map which is a final output of the convolutional network.

However, although the CAM has robust performance in presenting a rough determination factor for the entire image, for example, when a size of a target image is very large or a number of objects are included in the image, a more specific determination may be required.

In addition, there is a demand to generate and utilize an image-level segmentation result of an object as label data for weakly-supervised training using the CAM. Therefore, for more accurate training, there is a need to develop an algorithm to generate more precise segmentation results in consideration of characteristics of objects in an image compared to the CAM.

SUMMARY

An object of the present invention provides a structure of a more efficient neural network for object segmentation.

Another object of the present invention provides a specific training method of a neural network for segmentation.

Still another object of the present invention provides a method for generating labeling data for training by using an output of a neural network.

Still yet another object of the present invention provides a method for defining an optimal loss according to the purpose of a neural network.

In an aspect of the present invention, a method for object segmentation using a trained neural network includes: receiving a segmentation target image; splitting the target image into unit images having a predetermined size; outputting a unit activation map for the split unit image as a first segmentation result by using the neural network; merging the unit activation map; and outputting a second segmentation result according to the merged unit activation map, in which the neural network is trained by mutually using the entire activation map for the target image and the merged activation map.

The neural network may be trained by defining a loss function as a first loss term defining a difference between the entire activation map and a ground-truth and a second loss term defining a difference between the merged activation map and the ground-truth.

The neural network may be trained by defining a difference between the entire activation map and the merged activation map as a third loss term.

The neural network may further include a global average pooling (GAP) layer that calculates a global average value of the output activation map, and calculate a loss using the global average value.

The neural network may include a final output feature map of a first layer network that performs a convolution operation, and a second layer network that outputs a class classification result by flattening the final output feature map, and generate the activation map by multiplying final output feature maps of n channels of the first layer network by weights for each n channel of the second layer network.

In another aspect of the present invention, an apparatus for object segmentation using a trained neural network includes: an image input module configured to receive a segmentation target image; an image splitting module configured to split the target image into unit images having a predetermined size; and a segmentation module configured to output a unit activation map for the split unit image as a first segmentation result by using the neural network, and merging the unit activation map to output a second segmentation result, in which the neural network is trained by mutually using the entire activation map for the target image and the merged activation map.

The neural network may be trained by defining a loss function as a first loss term defining a difference between the entire activation map and a ground-truth and a second loss term defining a difference between the merged activation map and the ground-truth.

The neural network may be trained by defining a difference between the entire activation map and the merged activation map as a third loss term.

DETAILED DESCRIPTION

The following description illustrates only a principle of the present invention. Therefore, those skilled in the art may implement the principle of the present invention and invent various devices included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

The above-mentioned objects, features, and advantages will become more obvious from the following detailed description provided in relation to the accompanying drawings. Therefore, those skilled in the art to which the present invention pertains may easily practice a technical idea of the present invention.

Further, in describing the present invention, in the case in which it is judged that a detailed description of a well-known technology associated with the present invention may unnecessarily make the gist of the present invention unclear, it will be omitted. Hereinafter, embodiments of the present invention will be described in detail with reference to the accompanying drawings.

Hereinafter, embodiments will be described in more detail with reference to FIG. 1.

Figure 1:
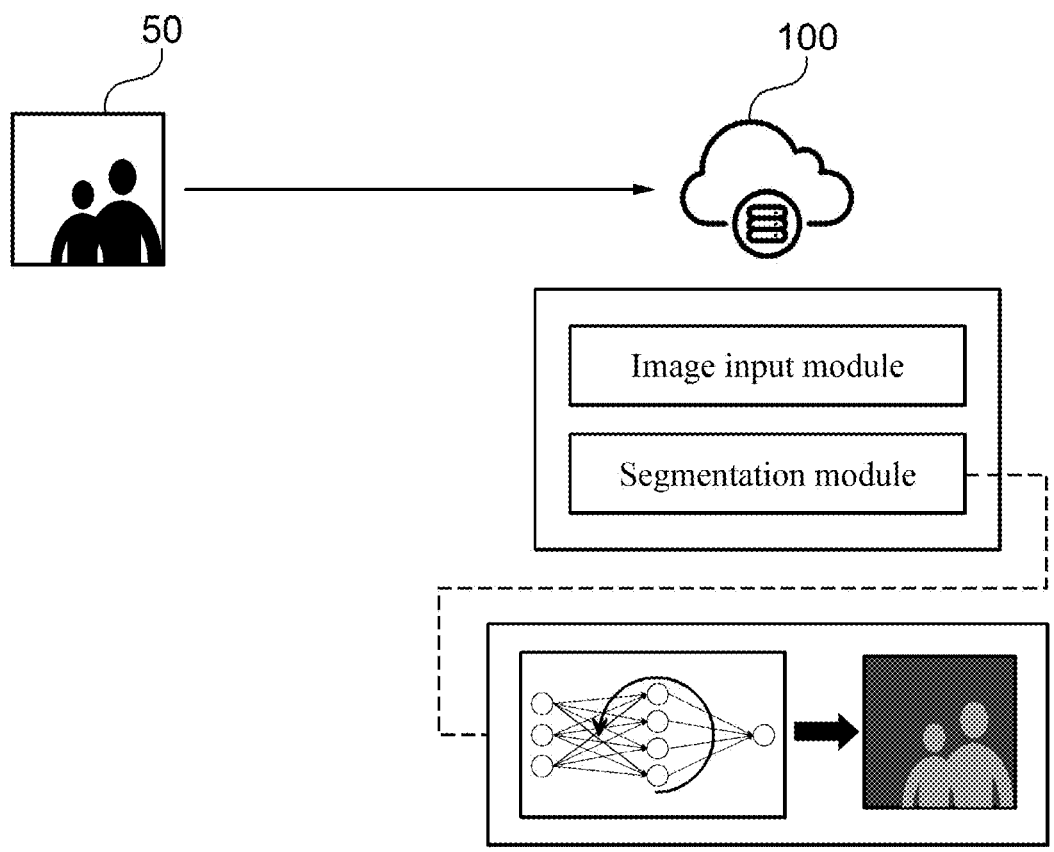
FIG. 1 is a diagram illustrating a structure of a system for performing object segmentation according to an embodiment of the present invention.

FIG. 1 is a diagram illustrating a structure of a system 100 for performing object segmentation according to an embodiment of the present invention.

Referring to FIG. 1, the system 100 for object segmentation according to the present embodiment may include an apparatus or a network server that receives and processes a target image.

The system 100 for object segmentation may be configured in a form capable of network communication in addition to performing segmentation from an image received on a single process, and may be implemented in a cloud form to receive and process images photographed by various photographing devices.

In addition, the system 100 for object segmentation may use the collected images as training data, and thus, may be configured to include a cloud-based memory for this purpose.

Specifically, the system 100 for object segmentation may include an image input module that receives the photographed image and a segmentation module that segments an internal object 10 through the image input module.

In addition, the system 100 for object segmentation may further include a neural network training module for training a neural network used by the segmentation module. In the present embodiment, the neural network training module may perform training using a difference between an activation map generated as a segmentation result of the entire image and a unit activation map generated as a segmentation result of the split partial images.

In the present embodiment, the segmentation may include dividing an area where an object is located together with classification of an object included in an image, so the area where the object is located may be divided in units of pixels or in the form of a bounding box. Specifically, in the present embodiment, the segmentation of the neural network is to classify images in units of pixels and aims at semantic segmentation. However, in the present embodiment, the segmentation result intends to be used as a label of the training data, and therefore, may be configured to output the classification result in units of pixels in the form of the bounding box.

Hereinafter, the process of segmenting the neural network according to the present embodiment will be described in more detail with reference to FIG. 2.

Figure 2:
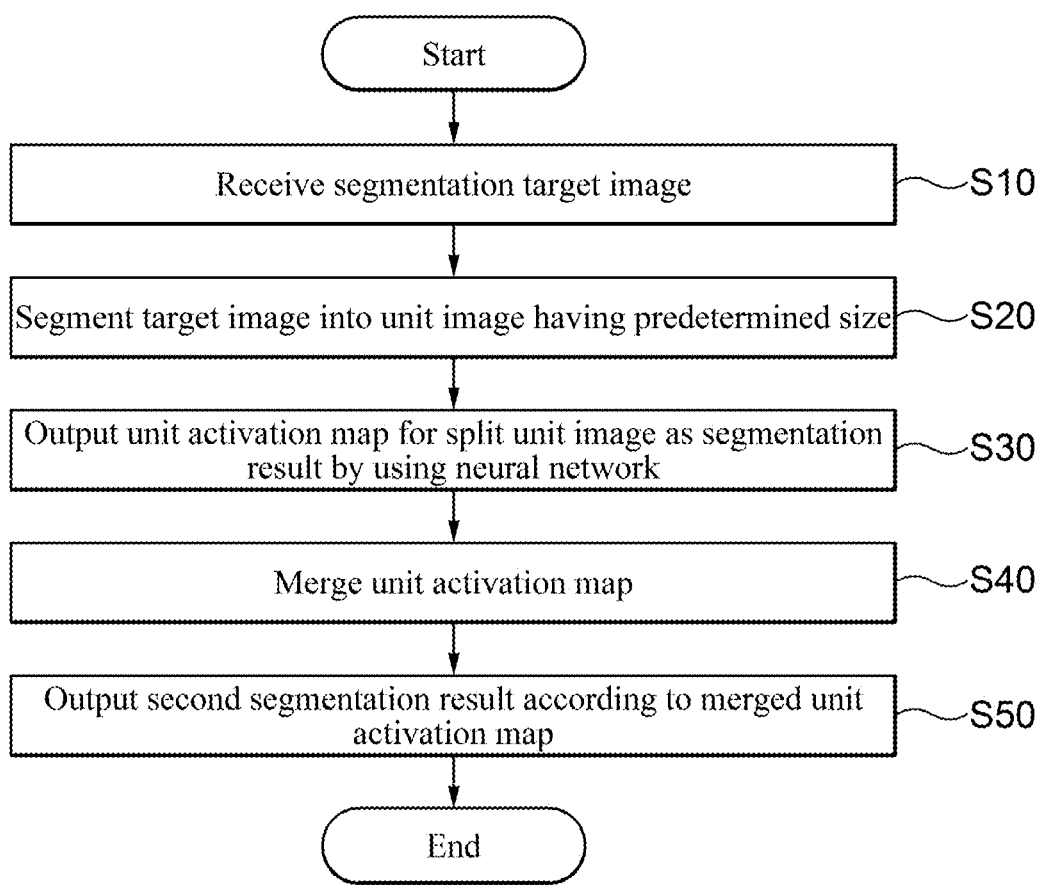
FIG. 2 is a diagram illustrating a process for object segmentation according to an embodiment of the present invention.

FIG. 2 is a flowchart illustrating a method for object segmentation according to an embodiment of the present invention.

First, the segmentation target image is received (S10).

Depending on the purpose, the segmentation target image may be an image obtained by photographing a large area at once for faster tracking, or a large-screen image.

For example, the large-screen image may be acquired in the form of an aerial photograph. For example, while a drone is flying, it is possible to acquire an image of a ground composed of more than 10 million pixels, and request segmentation of an object with a very small size compared to the entire area within the acquired large-screen image.

An actual human-like object may be located in an area corresponding to several thousandths to several ten thousandths within one image, and therefore a large amount of computation is required to track the object.

Alternatively, when the size of the object is very large compared to the image, it is necessary to segment the area in which the object exists in more detail.

Therefore, in the present embodiment, the neural network splits the image itself and merges the segmentation results in the split unit image to derive more detailed division results.

In the present embodiment, the input image is split into unit images to perform more efficient segmentation, and layers in the neural network also perform the training and segmentation based on the split unit image (S20).

Figure 3:
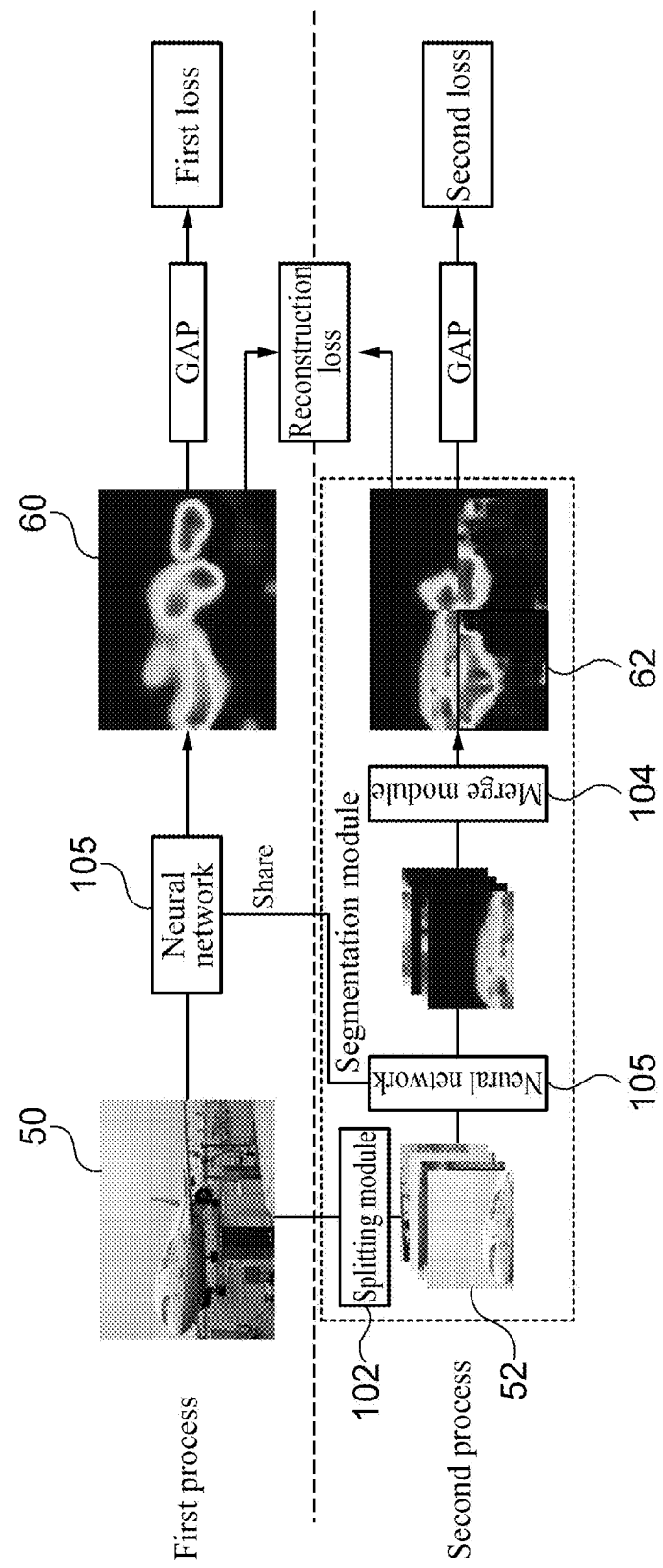
FIG. 3 is a diagram illustrating a process of training a neural network according to an embodiment of the present invention.

In detail, referring to FIG. 3 to describe the method for training a neural network, in the present embodiment, an original image 50 is split into unit images 52 having a predetermined size and used for the segmentation.

In addition, as an additional embodiment, when splitting the image 50 into the unit images, it is possible to allow overlap between some of the unit images, and it is also possible to merge the unit images based on the overlapped portions.

Referring to FIG. 3, in the present embodiment, the neural network 105 performing the segmentation may perform the object segmentation on each of the split unit images 52 through a splitting module while performing the object segmentation on the entire original image 50.

In this case, the structure of the neural network 105 may be implemented in the same way, and may share the network structure and layer. In addition, in the neural network 105, a feature map output from a convolution network is generated as a vector value according to the number of filters in s global average pooling (GAP) layer, so a size of the input image may be freely determined.

Accordingly, a second process at the bottom may provide each of the split unit images 52 as one input to the neural network 105 in the splitting module 102, and may acquire a unit activation map 62 as each segmentation result.

In addition, the first process at the top may acquire the entire activation map 60 as a segmentation result of the neural network 105 for the entire image 50.

A detailed method of acquiring an activation map will be described with reference to FIG. 4.

Figure 4:
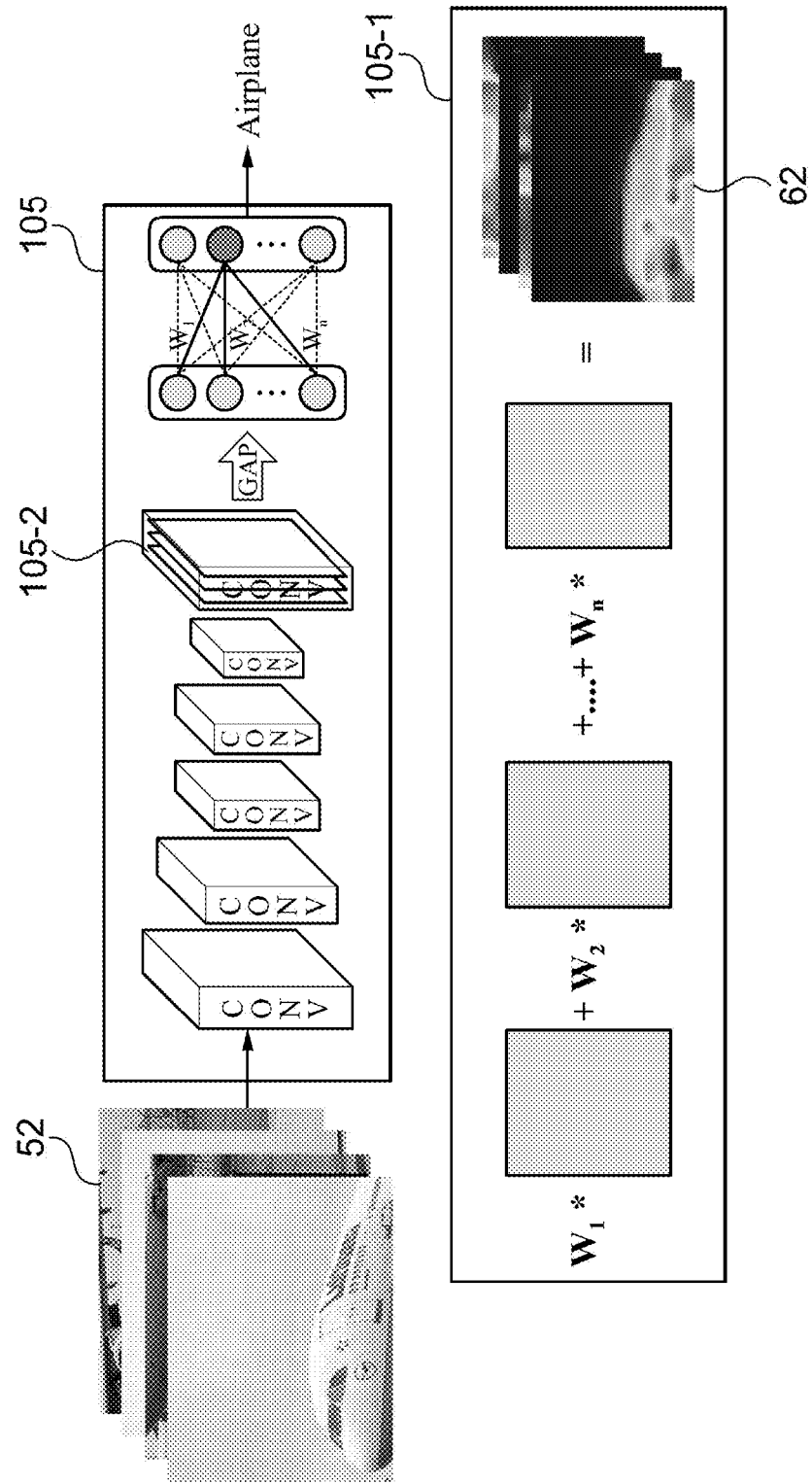
FIG. 4 is a diagram illustrating a structure of the neural network according to the embodiment of the present invention.
Figure 5A:
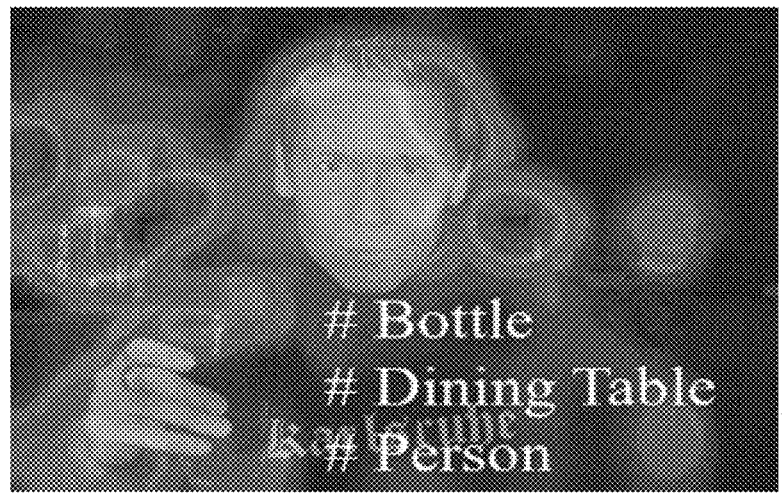
FIGS. 5A to 5D are diagrams illustrating a training result according to a configuration of a loss function of the neural network according to the embodiment of the present invention.
Figure 5B:
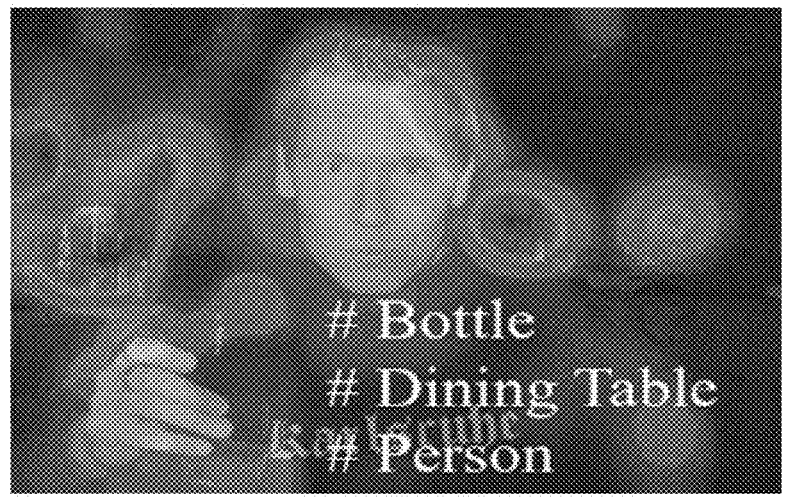
Figure 5C:
Figure 5D:

Referring to FIG. 4, the structure of the neural network for acquiring the activation map is illustrated.

Since the above-described first process and second process share the neural network, the second process will be described as a representative.

In the second process, the entire image 50 is split into four unit images 52, and each image is input to the neural network 105.

The neural network includes a convolution (Conv) network that performs a general convolution operation.

The convolutional network includes a plurality of convolutional layers, and the convolutional layers emphasize object-related features through a convolution operation between values of an image and an internal filter.

In this case, a last convolutional layer 105-2 of the convolutional network may output a plurality of feature maps according to the predetermined number of channels.

That is, the feature map is a value in which a main feature for identifying objects for each channel is emphasized according to a position value, and may be generated in a matrix form.

The feature map output from the above convolutional network may be flattened through the global average pooling (GAP) layer.

Specifically, an average of the values of the feature maps for each channel may be generated as a single vector value through the global average pooling layer, and thus, a flattened value of a one-dimensional array composed of a set of vector values for each channel may be obtained.

Next, the output of the global average pooling layer is calculated with weights ($W_1, W_2, \ldots W_n$) defined for each class of an object to be classified, and may be finally output as the object classification result through an activation function such as Softmax.

In this case, the neural network may additionally generate an activation map by using the classification result.

That is, when a result of classifying an object in an image as an airplane in FIG. 4 is output, an internal computation network 105-1 may generate the activation map using the result at this time.

Specifically, when the classification result is output as an airplane, the internal computation network 105-1 may multiply the weights ($W_1, W_2, \ldots W_n$) used to determine the airplane by the feature maps for each channel before pooling corresponding to each weight again, thereby checking which value of which of the feature maps has influenced the determination of the airplane. Accordingly, by outputting the classification result again in the form of a two-dimensional unit image, it is possible to intuitively indicate the position at which the object exists and the importance of the feature of the object.

Finally, an activation map in the form of a heat map may be generated by summing the weights assigned to the feature maps for each channel again based on a pixel position in two dimension.

In other words, pixels that have a major influence on the classification have a larger value, and therefore, may have an accentuated color. Conversely, the activation map may be generated, for example, in a similar way to color temperature so that pixels with no influence have a primary color.

In the present embodiment, since a plurality of unit images are input, a unit activation map for each unit image is generated (S30). Furthermore, the neural network of the first process may also generate the activation map for the entire original image by the above-described method.

Referring back to FIG. 3, the unit activation maps are merged in order to configure the unit activation map generated according to FIG. 4 to the same size as the entire image (S40).

Next, the second process outputs a second segmentation result according to the merged unit activation map (S50).

In this case, in the present embodiment, the loss is calculated using the outputs of the first process and the second process for training the neural network.

That is, on the premise that the merged activation map and the entire activation map are generated from the images of the same object and have the same segmentation result, weakly-supervised training is performed using both activation maps.

That is, training is performed using the similarity of both outputs in addition to the labeled ground-truth.

Specifically, in the present embodiment, a loss function may be constructed using three loss terms.

In a general form, the neural network repeats training in a direction in which an error according to the loss function becomes a minimum value. In the present embodiment, the loss function may be constructed using the error between the ground-truth and the outputs of each neural network and a relative error between the outputs of the neural networks.

Specifically, the global average pooling layer may be added to calculate the loss, so a value according to the global average pooling (G) for the entire activation map and the global average pooling value for the merged activation map are calculated.

The loss function is a first loss term ($L_{cls}$) defining a difference between a pooling value ($\hat{Y}^s=G(A^s)$) of an activation map ($A^s$) of the entire image and the ground-truth (Y) and a second loss term ($L_{p\text{-}cls}$) defining a difference between the ground-truth and a pooling value ($\hat{Y}^{re}=G(A^{re})$) of an activation map ($A^{re}$) that merges a plurality of activation maps generated from the unit image and the ground-truth, and may be defined by Equation 1 below.

$$\mathcal{L}_{cls} = \ell_{cls}(\hat{Y}^s, Y), \qquad \text{[Equation 1]}$$
$$\mathcal{L}_{p\text{-}cls} = \ell_{cls}(\hat{Y}^{re}, Y)$$

In addition, in the present embodiment, since the neural network uses the merged result, an error therefor may be further included as a loss.

That is, the neural network may define the difference between the entire activation map and the merged activation map as a third loss term by Equation 2 below.

$$\mathcal{L}_{re} = \|A^s - A^{re}\|_1 \qquad \text{[Equation 2]}$$

The neural network constructs the loss function composed of the above-described loss terms, but regulates a deviation between the loss terms by using $\alpha$ as a control variable for the third loss term, and performs training using the final calculated Equation 3 below.

$$\mathcal{L} = \mathcal{L}_{cls} + \mathcal{L}_{p\text{-}cls} + \alpha \mathcal{L}_{re} \qquad \text{[Equation 3]}$$

That is, the neural network according to the present embodiment may perform training so that the segmentation result of the entire image and the unit image approaches the ground-truth and at the same time perform the training to reduce the difference between both results, and thus, finally, the neural network may output a more accurate segmentation result through the activation map generated for the unit image.

Hereinafter, the segmentation result using the neural network according to the present embodiment will be described.

First, referring to FIGS. 5A to 5D, it may be confirmed that the segmentation result of the neural network may be further improved by using the loss function according to the present embodiment.

The neural network may output a result (FIG. 5A) of using the first loss term as the loss function and a fine but more accurate segmentation result (FIG. 5B) when the second loss term is additionally used.

In addition, it may be confirmed that a more emphasized result (FIG. 5C) is output for a main object (#Person) for the image by using the first loss term and the third loss term, and a more accurate segmentation result (FIG. 5D) for an object included in an image may be output by using all of the first to third loss terms.

Accordingly, in the present embodiment, depending on the purpose of the neural network, the neural network may be trained to be suitable for more various situations by selectively using the terms of the loss function in the structures of the above-described first process and second process.

Figure 6A:
FIGS. 6A to 6C are diagrams illustrating a segmentation result of the neural network according to the embodiment of the present invention.
Figure 6B:
Figure 6C:
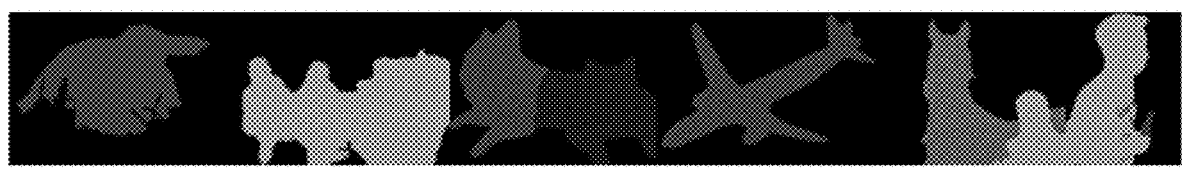

Furthermore, describing the segmentation results of the neural network according to the present embodiment with reference to FIGS. 6A to 6C, it may be confirmed that the output value of FIG. 6C is very similar to the ground-truth of FIG. 6b with respect to the original image of FIG. 6A.

Figure 7:
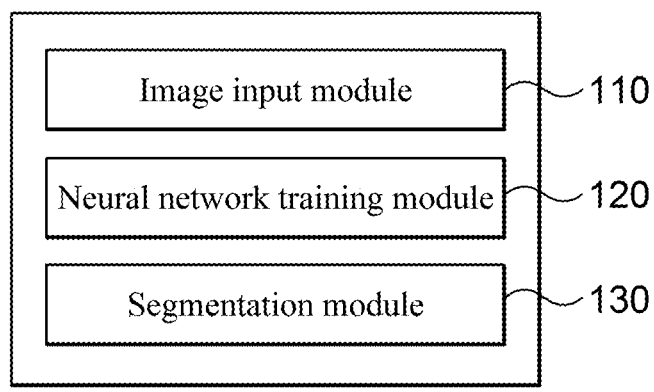
FIG. 7 is a diagram illustrating a configuration of a system for object segmentation according to an embodiment of the present invention.

Hereinafter, the system 100 for object segmentation of the neural network described above will be described with reference to FIG. 7.

In the present embodiment, the system 100 may include an image input module 110, a neural network training module 120, and a segmentation module 130.

As described above, the image input module 110 receives images photographed from various photographing devices such as drones or CCTVs. For example, a high-quality large-screen image obtained by photographing a wider area in order to track a person for the same purpose as lifesaving may be received.

Next, the neural network training module 120 may train the neural network to track an object.

Specifically, in the present embodiment, the neural network may split the entire image together with the entire original image into unit images and use the unit image for training.

As described above, the neural network module 120 shares the neural network and generates respective results through first and second processes performed in parallel, and performs the weakly-supervised training using the generated results.

That is, the training is performed using the difference between the activation map generated in the first process and the activation map obtained by merging the plurality of unit activation maps generated in the second process together with the pre-labeled ground-truth for the entire image.

Furthermore, the difference according to the merging of the entire image and the unit image may be additionally used as a loss, and each loss at this time may be variously selected according to the purpose of object tracking, and thus, may be constructed as a final loss function.

The segmentation module 130 outputs a segmentation result of an object using the above trained neural network.

The segmentation module 130 may output the segmentation result by generating the activation map using a weight that has an influence on the determination of the object along with the tracking of the object through the neural network used for training and the global average pooling.

In addition, it is also possible to generate training data by labeling the area information included in the output segmentation result in units of pixels or in the form of the bounding box. For example, by comparing the values of the activation map generated as the segmentation result with a threshold value, pixels greater than or equal to the threshold value may be generated as a continuous boundary line and labeled.

Furthermore, the system 100 according to the present invention may separate the training and inference processes, receive the trained neural network model according to the above-described method from the outside, and use the received trained network model to operate the segmentation module 130.

Hereinabove, according to the present invention, it is possible to generate the more accurate object segmentation result.

In addition, according to the present invention, it is possible to generate the label using the segmentation result and use the generated label for the training of the neural network.

In addition, the present invention may perform higher-performance training by using the existing neural network for generating the class activation map as it is.

More accurate segmentation results may be generated without additional resources.

Furthermore, various embodiments described herein may be implemented in a recording medium readable with a computer or a similar device using, for example, software, hardware, or a combination thereof.

According to a hardware implementation, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, the embodiments described in the disclosure may be implemented by the control module itself.

According to the software implementation, embodiments such as procedures and functions described in the disclosure may be implemented by separate software modules. Each of the software modules may perform one or more functions and operations described in the disclosure. The software code may be implemented as a software application written in a suitable programming language. The software code may be stored in the memory module and executed by the control module.

The spirit of the present invention has been described only by way of example hereinabove, and the present invention may be variously modified, altered, and substituted by those skilled in the art to which the present invention pertains without departing from essential features of the present invention.

According to the present invention, it is possible to generate a more accurate object segmentation result.

In addition, according to the present invention, it is possible to generate a label using a segmentation result and use the generated label for training of a neural network.

In addition, according to the present invention, it is possible to perform higher-performance training by using a neural network for generating the existing class activity map as it is, and generate a more accurate segmentation result without additional resources.

Accordingly, the exemplary embodiments disclosed in the present invention and the accompanying drawings do not limit but describe the spirit of the present invention, and the scope of the present invention is not limited by the exemplary embodiments and the accompanying drawings. The scope of the present disclosure should be interpreted by the following claims and it should be interpreted that all spirits equivalent to the following claims fall within the scope of the present disclosure.

What is claimed is:

1. A method for object segmentation using a trained neural network, comprising:
    receiving a target image;
    splitting the target image into unit images having a predetermined size;
    outputting a unit activation map for the split unit image as a first segmentation result by using the neural network;
    merging the unit activation map; and
    outputting a second segmentation result according to the merged unit activation map,
    wherein the neural network is trained by defining a loss function as a first loss term defining a difference between the entire activation map of an original image and a ground-truth, a second loss term defining a difference between the merged activation map merged with a unit activation map of a unit image split from the original image and the ground-truth, and a third loss term defining a difference between the entire activation map and the merged activation map.

2. The method of claim 1, wherein the neural network further includes a global average pooling (GAP) layer that calculates a global average value of the output activation map, and
    calculates a loss using the global average value.

3. The method of claim 1, wherein the neural network includes a final output feature map of a first layer network that performs a convolution operation, and a second layer network that outputs a class classification result by flattening the final output feature map, and
generates the activation map by multiplying final output feature maps of n channels of the first layer network by weights for each n channel of the second layer network.

4. An apparatus for object segmentation using a trained neural network, comprising:
    an image input module configured to receive a segmentation target image;
    an image splitting module configured to split the target image into unit images having a predetermined size; and
    a segmentation module configured to output a unit activation map for the split unit image as a first segmentation result by using the neural network, and merging the unit activation map to output a second segmentation result,
    wherein the neural network is trained by defining a loss function as a first loss term defining a difference between the entire activation map of an original image and a ground-truth, a second loss term defining a difference between the merged activation map merged with a unit activation map of a unit image split from the original image and the ground-truth, and a third loss term defining a difference between the entire activation map and the merged activation map.

5. A computer-readable recording medium in which a program for performing a method for object segmentation using a trained neural network is stored, wherein the method includes:
    receiving a segmentation target image;
    splitting the target image into unit images having a predetermined size;
    outputting a unit activation map for the split unit image as a first segmentation result by using the neural network;
    merging the unit activation map; and
    outputting a second segmentation result according to the merged unit activation map,
    wherein the neural network is trained by defining a loss function as a first loss term defining a difference between the entire activation map of an original image and a ground-truth, a second loss term defining a difference between the merged activation map merged with a unit activation map of a unit image split from the original image and the ground-truth, and a third loss term defining a difference between the entire activation map and the merged activation map.

* * * * *